(12) United States Patent
Witter et al.

(10) Patent No.: US 7,120,774 B2
(45) Date of Patent: *Oct. 10, 2006

(54) EFFICIENT MANAGEMENT OF MEMORY ACCESS REQUESTS FROM A VIDEO DATA STREAM

(75) Inventors: Todd M. Witter, Orangevale, CA (US); Aditya Sreenivas, El Dorado Hills, CA (US); Kim Meinerth, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 293 days.

This patent is subject to a terminal disclaimer.

(21) Appl. No.: 10/672,328

(22) Filed: Sep. 26, 2003

(65) Prior Publication Data

US 2005/0044334 A1 Feb. 24, 2005

Related U.S. Application Data

(63) Continuation of application No. 09/475,735, filed on Dec. 30, 1999, now Pat. No. 6,629,253.

(51) Int. Cl.
  *G06F 12/00* (2006.01)
(52) U.S. Cl. ........................ 711/167; 713/401
(58) Field of Classification Search ............... 711/167; 713/401
  See application file for complete search history.

(56) References Cited

U.S. PATENT DOCUMENTS

| 5,146,592 | A | * | 9/1992 | Pfeiffer et al. ............... 715/807 |
| 5,396,494 | A | | 3/1995 | Roposh |
| 5,440,680 | A | * | 8/1995 | Ichikawa et al. ............ 715/807 |
| 5,557,783 | A | | 9/1996 | Oktay et al. |
| 6,038,034 | A | | 3/2000 | Nishio et al. |
| 6,199,149 | B1 | * | 3/2001 | Meinerth et al. ............ 711/167 |
| 6,209,061 | B1 | | 3/2001 | Nelson et al. |
| 6,212,611 | B1 | | 4/2001 | Nizar et al. |
| 6,247,104 | B1 | | 6/2001 | Suzuki |
| 6,351,783 | B1 | | 2/2002 | Garney et al. |
| 6,425,023 | B1 | | 7/2002 | Batchelor et al. |
| 6,629,253 | B1 | * | 9/2003 | Witter et al. ................. 713/401 |

FOREIGN PATENT DOCUMENTS

JP  362226264 A  10/1987

* cited by examiner

*Primary Examiner*—Pierre Bataille
*Assistant Examiner*—Sheng-Jen Tsai
(74) *Attorney, Agent, or Firm*—Blakely, Sokoloff, Taylor & Zafman LLP

(57) ABSTRACT

A method and apparatus for managing overlay data requests are disclosed. One embodiment of an apparatus includes a request unit and a timer. A request is made by a graphics controller to the request unit for a line of overlay data. The request unit divides the request from the graphics controller into a series of smaller requests. The smaller requests are issued to a memory controller. Delays are inserted between each of the smaller requests in order to allow other system resources to more easily gain access to memory.

10 Claims, 4 Drawing Sheets

EFFICIENT MANAGEMENT OF MEMORY ACCESS REQUESTS FROM A VIDEO DATA STREAM

This application is a continuation of U.S. Ser. No. 09/475,735, entitled "Method and Apparatus for Efficient Management of Memory Access Requests From a Planar Video Overlay Data Stream", filed Dec. 30, 1999 now U.S. Pat. No. 6,629,253.

FIELD OF THE INVENTION

The present invention pertains to the field of computer systems. More particularly, this invention pertains to the field of managing memory access requests from video overlay data streams.

BACKGROUND OF THE INVENTION

An important function of computer systems is that of processing isochronous data streams. Isochronous data streams are those data streams that have strict throughput and latency requirements. An example of one such data stream is a stream of overlay data for a graphics controller. If the required overlay data is not delivered to the graphics controller at the required rate and within the required time period, then some form of display corruption will result.

Isochronous data streams typically have very even data consumption rates, that is, for a given period of time, the amount of data consumed will always be the same. Memory access, on the other hand, is typically very uneven due to arbitration with other data streams. For example, when a graphics device requires data it must arbitrate for access to memory with other system resources. The result is uneven and unpredictable access to memory. Another issue with isochronous data streams is that an isochronous data stream is likely to operate at a different clock frequency than that of the memory subsystem. These two issues can be solved by using an intermediate storage first-in, first-out buffer (FIFO). The FIFO can accept data from memory at whatever rate the memory can deliver the data and the FIFO can output data at the rate required by the isochronous data stream.

The FIFO technique works so long as the FIFO is never allowed to go empty. If the FIFO goes empty at any point, the isochronous data stream will be corrupted. To help prevent this situation, isochronous data streams are typically assigned the highest priority for arbitrating access to memory. Overlay data streams present a problem in that overlay data streams may request an entire display line worth of data at a given time. Because isochronous data streams are typically assigned the highest arbitration priority, the overlay data stream can effectively shut out other data streams from accessing memory for significant periods of time during overlay data line transfers. Because the overlay display line can be quite large, a significant degradation of system performance can result. This may be especially true in the case where the overlay data is stored in system main memory, where the system's processor must compete for access to system main memory with the overlay data stream.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 1:
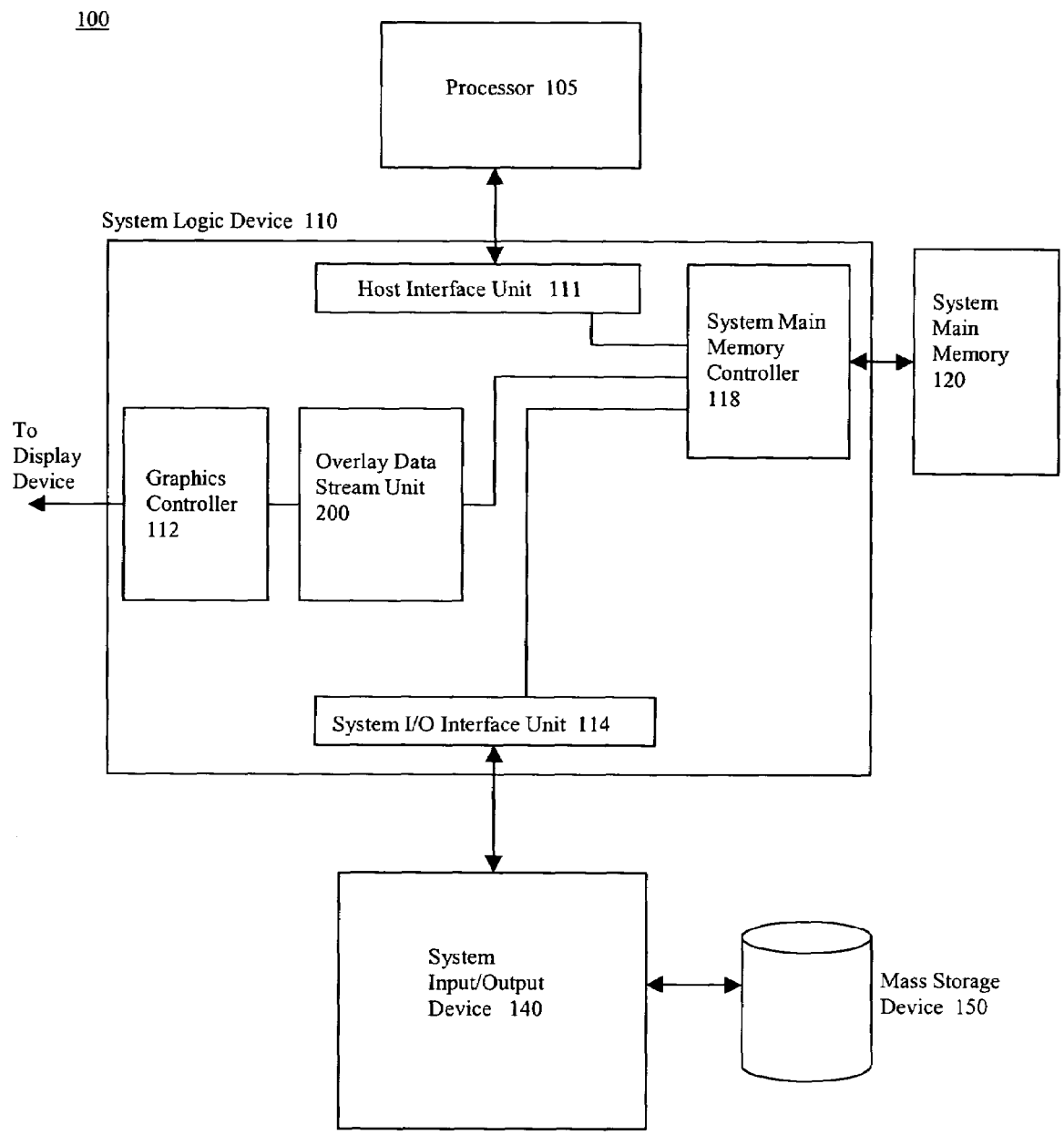
FIG. 1 is a block diagram of a computer system that includes a system logic device configured in accordance with an embodiment of the invention.

An embodiment of an apparatus for managing overlay data requests includes a request unit and a timer. A request is made by a graphics controller to the request unit for a line of overlay data. The request unit divides the request from the graphics controller into a series of smaller requests. The smaller requests are issued to a memory controller. Delays are inserted between each of the smaller requests in order to allow other system resources to more easily gain access to memory.

Another embodiment of an apparatus for efficiently managing overlay data requests includes a request unit and two timers. The request unit receives a request for a relatively large overlay data transfer from a graphics controller. The request may be for a line of overlay data stored in a memory device. The overlay data may be organized into one plane of luminance data and two planes of chrominance data, and therefore the request unit must issue requests for overlay data from three separate areas of memory. The request unit divides the large request into a series of smaller request fragments. The smaller requests to the three planes of overlay data are then interleaved. For example, a first request is made for a fragment from the first plane of overlay data, then a second request is made for a fragment from the second plane of overlay data, and then a third request is made for a fragment from the third plane of overlay data. The sequence is repeated until the entire larger request from the graphics controller is satisfied. The data returned from memory is stored in a first-in/first-out temporary storage buffer (FIFO).

Because the overlay data stream is isochronous and is therefore granted a very high arbitration priority level, the request for fragments of overlay data may have the effect of dominating access to the memory device and preventing important system resources such as a processor from gaining timely access to the memory device. To solve this, delays are inserted between overlay data requests. For example, after the request unit issues a request for a data fragment from the first overlay data plane, the request unit waits for a delay time before issuing a request for a data fragment from the second overlay data plane. The request unit then waits again for the delay time before issuing a request for a fragment of data from the third overlay data plane. After the request unit requests a data fragment from each of the three data planes, the request unit waits for an additional delay time before again beginning to issue requests for data fragments from the three overlay data planes. The delay times are determined by two programmable timers. One timer controls the amount of delay between requests for data from the first and second overlay data planes and also between requests for data from the second and third overlay data planes. The second timer controls the amount of delay inserted following requests for data from the third overlay data plane. The delays provide windows of time in which the processor or other system resource can gain timely access to memory without interference from the overlay data stream.

FIG. 1 is a block diagram of a computer system 100 that includes a system logic device 110. The system logic device 110 includes an overlay data stream unit 200 to facilitate overlay data transfers between system main memory 120 and a graphics controller 112. The overlay data stream unit 200 communicates to the system main memory 120 through a system main memory controller 118. The system main memory controller 118 also receives memory access requests from a host interface unit 111 and a system input/output interface unit 114 which are coupled to a processor 105 and a system input/output device 140, respectively. The system input/output device 140 is further coupled to a mass storage device 150.

The system main memory controller 118 arbitrates for access to the system main memory 120 among memory access requests from the overlay data stream unit 200, the host interface unit 111 and the system input/output interface unit 114. Requests received by the system main memory interface unit 118 from the overlay data stream unit 200 are assigned the highest arbitration priority.

Although the embodiments described herein discuss overlay data stored in system main memory 120, other embodiments are possible where the overlay data is retrieved by the overlay data stream unit 200 from a graphics local memory.

Figure 2:
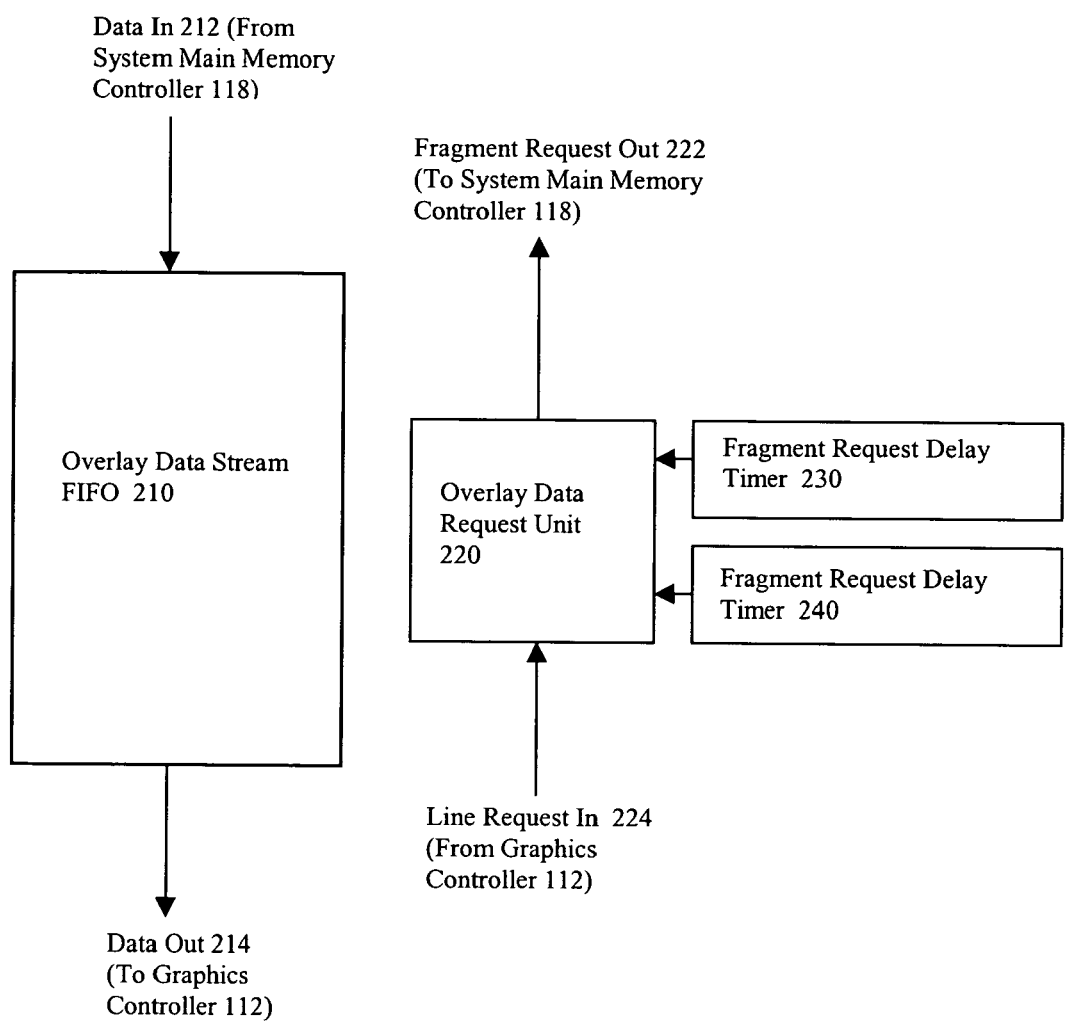
FIG. 2 shows a block diagram of part of an overlay data stream unit including an overlay request unit and two timers configured in accordance with an embodiment of the invention.

FIG. 2 shows elements of the overlay data stream unit 200. The overlay data stream unit includes an overlay data stream FIFO 210 that serves as temporary storage for overlay data. The overlay data stream FIFO 210 may be large enough to store an entire line of overlay data. The overlay data stream FIFO 210 receives overlay data from the system main memory controller 118 over a data in path 212. The overlay data stream FIFO 210 delivers overlay data to the graphics controller 112 via a data out path 214.

The overlay data stream unit 200 also includes an overlay data request unit 220. The overlay data request unit 220 receives overlay data requests from the graphics controller 112 over a line request in path 224. In this example embodiment, the graphics controller requests overlay data one entire line at a time, although other embodiments are possible where the graphics controller 112 requests other amounts of overlay data.

The overlay data request unit 220 receives a request for a line of overlay data from the graphics controller 112. For this embodiment, the overlay data is organized into one plane of luminance data and two planes of chrominance data. The overlay data request unit 220 therefore must issue requests for overlay data from three separate areas of memory. The requests are issued to the system main memory controller 118 via a fragment request out path 222. The overlay data request unit 220 divides the request for a line of overlay data into a series of smaller request fragments. The smaller requests to the three planes of overlay data are then interleaved. For example, a first request is made for a fragment from the first plane of overlay data, then a second request is made for a fragment from the second plane of overlay data, and then a third request is made for a fragment from the third plane of overlay data. The sequence is repeated until the entire line request from the graphics controller 112 is satisfied. The data returned from memory is stored in the overlay data FIFO 210.

The overlay data stream unit 200 also includes fragment request delay timers 230 and 240. Delays are inserted between requests for overlay data fragments. For example, after the overlay data request unit 220 issues a request for a data fragment from the first overlay data plane, the overlay data request unit 220 waits for a delay time before issuing a request for a data fragment from the second overlay data plane. The overlay data request unit 220 then waits again for the delay time before issuing a request for a fragment of data from the third overlay data plane. The delay time is determined by the fragment request delay timer 230. After the overlay data request unit 220 requests a data fragment from each of the three data planes, the overlay data request unit 220 waits for an additional delay time before again beginning to issue requests for data fragments from the three overlay data planes. This additional delay time is determined by the fragment request delay timer 240. The fragment request delay timers 230 and 240 may be programmable. Further, the delay time determined by the fragment request delay timer 240 may be greater than that determined by the fragment request delay timer 230.

The above described sequence of requests for overlay data fragments is repeated until the entire line requested by the graphics controller 112 is loaded into the overlay data stream FIFO 210. The delays between requests for overlay data fragments provide windows of time in which the processor 105 or other system resource can gain timely access to system main memory 130 without interference from the overlay data stream unit 200. The delay times should be long enough to allow the processor 105 adequate response by the system main memory controller 118 but also should be short enough to ensure that the requested line of data is returned to the overlay data stream FIFO 210 within the required period of time.

Figure 3:
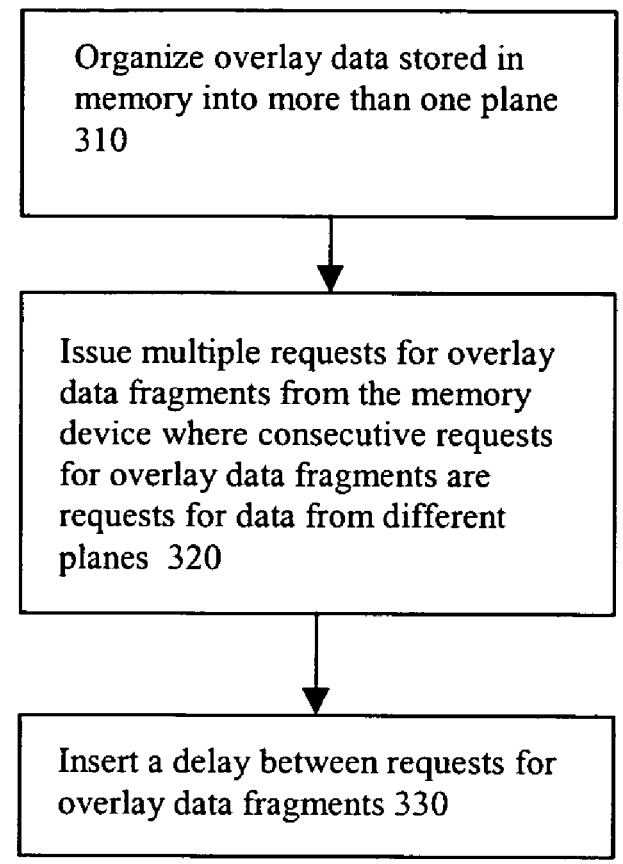
FIG. 3 is a flow diagram of an embodiment of a method for efficiently managing overlay data requests.

FIG. 3 is a flow diagram of an embodiment of a method for efficiently managing overlay data requests. At step 310, the overlay data stored in memory is organized into more than one plane of data. One embodiment includes three planes of data. At step 320, multiple requests for overlay data fragments from the memory device are issued. Consecutive requests for overlay data fragments are made for fragments from different planes. For example, a first request for a fragment of overlay data may be to a first data plane while the next request for a fragment of overlay data may be to a second data plane. Step 330 indicates that delays are inserted between requests for fragments of overlay data. The delays are inserted in order to provide other system resources better opportunities to gain access to memory.

Figure 4:
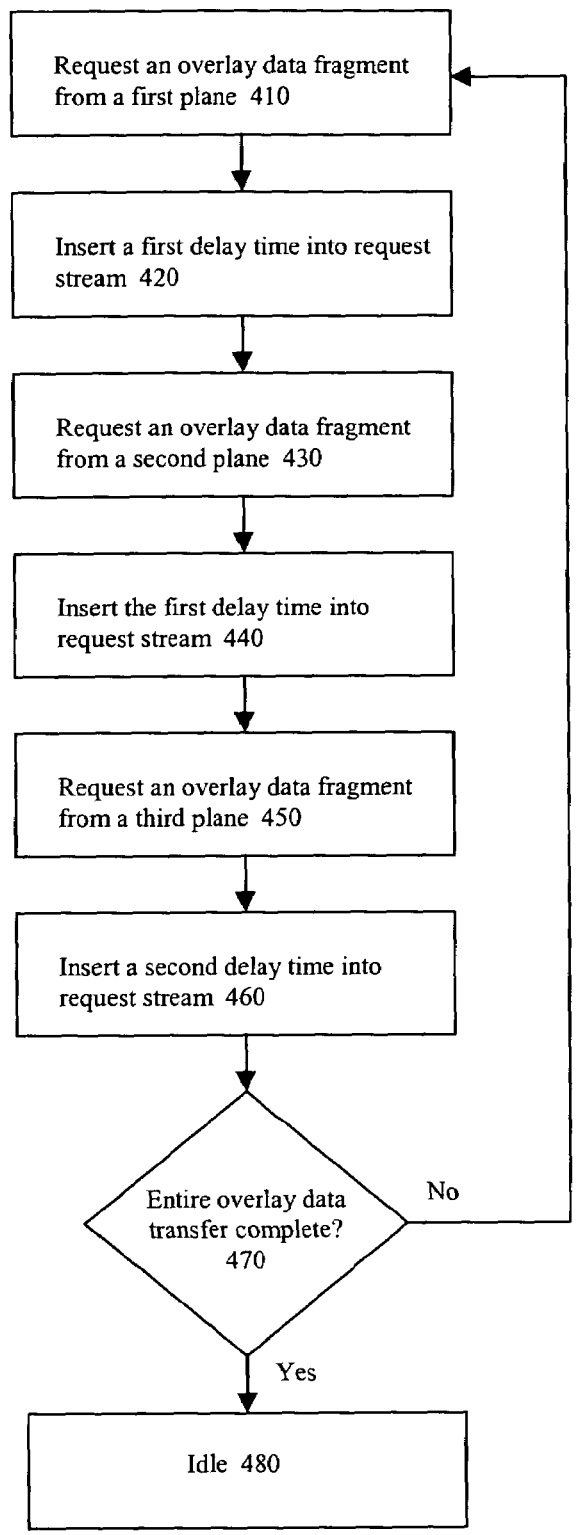
FIG. 4 is a flow diagram of an additional embodiment of a method for efficiently managing overlay data requests.

FIG. 4 is a flow diagram of an additional embodiment of a method for managing overlay data requests. At step 410, a request is made for a fragment of overlay data from a first plane of overlay data. Following the request made at step 410, a first delay time is inserted into the request stream at step 420, meaning that the next request for overlay data must wait until the first delay time has elapsed. At step 430, a request is made for a fragment of overlay data from a second plane of overlay data. Following the request made at step 430, the first delay time is again inserted into the request queue at step 440, meaning that the next request for overlay data wait until the first delay time again elapses. At step 450, a request is made for a fragment of overlay data from a third plane of overlay data. Following the request made at step 450, a second delay time is inserted in to the request stream at step 460, meaning that no further requests for overlay data can be issued until the second delay time has elapsed. The second delay time may be greater than the aforementioned first delay time.

At step 470, a determination is made as to whether the entire requested overlay data transfer has completed. If the entire transfer has completed, then an idle state is entered into at step 480. Otherwise, the process described above is repeated with the process recommencing at step 410.

Although the embodiments above are described as including streams of overlay data, other embodiments are possible using other streams of isochronous data. Also, although the embodiments above are described as accessing system main memory, other embodiments are possible where the memory accesses are to a graphics local memory device or to other memory devices.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

What is claimed is:

1. An apparatus, comprising:
   a request unit to request more than one fragment of isochronous data from a memory device, wherein the isochronous data is overlay data organized in the memory device as more than one plane of data; and
   a timer to insert a delay time between consecutive fragment requests for fragments from different planes.

2. The apparatus of claim 1, wherein the isochronous data is overlay data organized in the memory device into a first, a second, and a third plane of overlay data.

3. The apparatus of claim 2, the request unit to request fragments from the memory device in the sequence of from the first plane, then from the second plane, then from the third plane, the request unit to then repeat the sequence.

4. The apparatus of claim 3, wherein the timer inserts a delay after requests for fragments from the first and second planes.

5. A method, comprising:
   organizing overlay data stored in a memory device into more than one plane;
   issuing multiple requests for overlay data fragments from the memory device where consecutive requests for overlay data fragments are requests for data from different planes; and
   inserting a delay between requests for overlay data fragments.

6. A method, comprising:
   organizing overlay data stored in a memory device into a first plane, a second plane, and a third plane;
   requesting an overlay data fragment from the first plane;
   inserting a delay after requesting the overlay data fragment from the first plane;
   requesting an overlay data fragment from the second plane;
   inserting a delay after requesting the overlay data fragment from the second plane;
   requesting an overlay data fragment from the third plane; and
   inserting a delay after requesting the overlay data fragment from the third plane.

7. A system, comprising:
   a memory device; and
   a system logic device coupled to the memory device, the system logic device including an overlay data unit, the overlay data unit including
      a request unit to request more than one fragment of overlay data from the memory device, wherein the overlay data is organized in the
      memory device as more than one plane of data, and
      a timer to insert a delay time between consecutive fragment requests for fragments from different planes.

8. The system of claim 7, wherein the overlay data is organized in the memory device into a first, a second, and a third plane of overlay data.

9. The system of claim 8, the request unit to request fragments from the memory device in the sequence of from the first plane, then from the second plane, then from the third plane, the request unit to then repeat the sequence.

10. The system of claim 9, wherein the timer inserts a delay after requests for fragments from the first and second planes.

* * * * *